(12) United States Patent
Malit

(10) Patent No.: US 7,513,508 B2
(45) Date of Patent: Apr. 7, 2009

(54) COMPUTER ASSISTED DRIVING OF VEHICLES

(76) Inventor: Romeo Fernando Malit, 11901 E. 176th St., Apt 243, Artesia, CA (US) 90701

(*) Notice: Subject to any disclaimer, the term of this patent is extended or adjusted under 35 U.S.C. 154(b) by 354 days.

(21) Appl. No.: 10/861,734

(22) Filed: Jun. 4, 2004

(65) Prior Publication Data

US 2005/0285356 A1     Dec. 29, 2005

(51) Int. Cl.
*B60G 17/015*     (2006.01)
(52) U.S. Cl. .................... 280/5.518; 701/209
(58) Field of Classification Search .............. 280/5.518; 701/209
See application file for complete search history.

(56) References Cited

U.S. PATENT DOCUMENTS

| 4,030,958 | A | * | 6/1977 | Stenemann | 156/350 |
| 6,000,703 | A | * | 12/1999 | Schubert et al. | 280/5.518 |
| 7,168,709 | B2 | * | 1/2007 | Niwa et al. | 280/5.518 |
| 7,195,250 | B2 | * | 3/2007 | Knox et al. | 280/5.518 |
| 7,266,560 | B2 | * | 9/2007 | Lampert et al. | 707/101 |
| 2002/0067292 | A1 | * | 6/2002 | Appenrodt et al. | 340/988 |
| 2003/0046158 | A1 | * | 3/2003 | Kratky | 705/14 |
| 2003/0123930 | A1 | * | 7/2003 | Jacobs et al. | 404/12 |
| 2004/0049339 | A1 | * | 3/2004 | Kober et al. | 701/209 |
| 2004/0088079 | A1 | * | 5/2004 | Lavarec et al. | 700/258 |

* cited by examiner

*Primary Examiner*—Eric Culbreth
(74) *Attorney, Agent, or Firm*—Ash Tankha

(57) ABSTRACT

Disclosed herein is a system and method for computer assisted driving of vehicles. The system disclosed herein provides an array of sensors positioned in the vehicles at strategic points for capturing vibrations and sound induced, when the vehicles move over pavement surfaces marked with pre-defined patterns of peaks and troughs. The sensors further measure frequencies of these vibrations. An onboard computer on the vehicle matches the captured frequencies and sound against pre-specified frequencies to obtain unique frequency signatures for the segment of the pavement traversed by the vehicle. Navigational data and geographical data associated with the unique frequency signature are used to provide assistance in driving of vehicles.

21 Claims, 5 Drawing Sheets

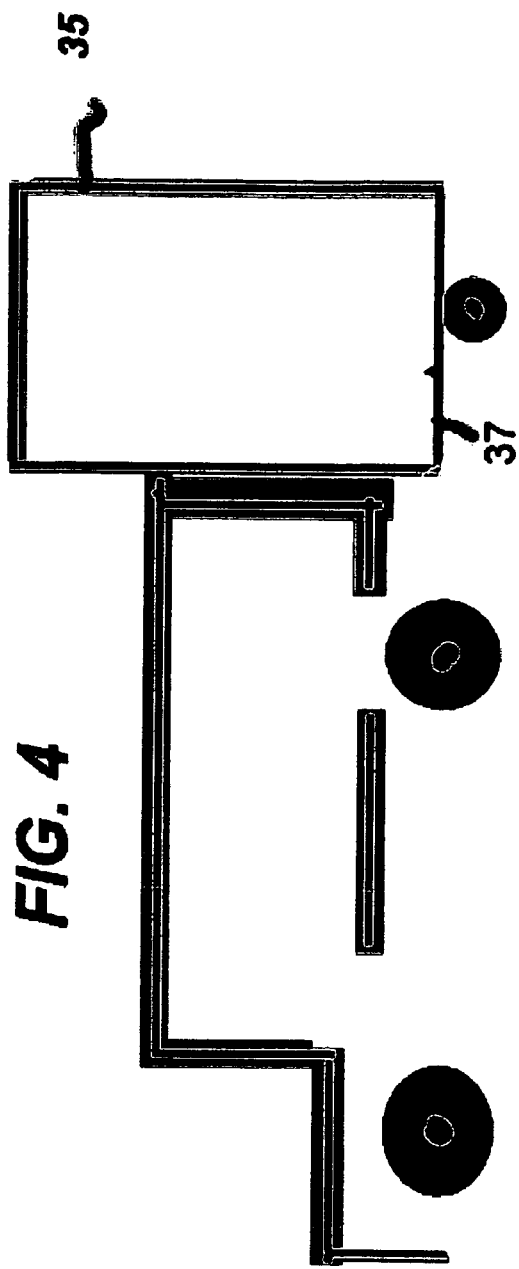
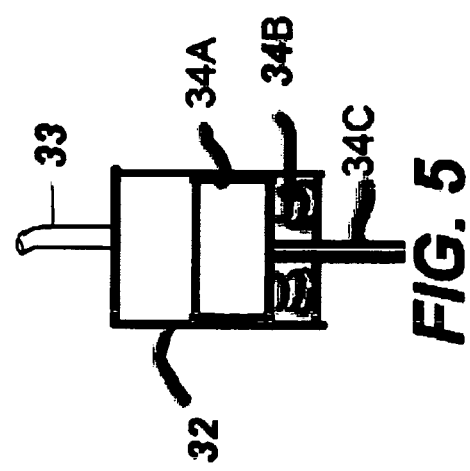

COMPUTER ASSISTED DRIVING OF VEHICLES

BACKGROUND

This invention generally relates to transportation. More specifically, this invention relates to a system and method for computer-assisted transportation.

Measurements and analyses of measurement data have been used for automated controlling of systems and processes. Different physical quantities such as pressure, strain, load, temperature, etc. are captured through heat, chemical, mechanical, or electrical signals. The signals are captured using different measuring instruments and the captured data provide sets of known values of the physical quantities that is used for analysis and control of systems and processes. Fingerprint recognition systems or biometrics determine the uniqueness of biometric samples. Sensors in a blood pressure machine measure pressure against the wall of the blood vessels. Reading the input data transmitted by the sensors has offered control and guidance, boundary and perimeter technologies. Collision and avoidance system and forward looking devices are in great use in today's cars as well as in global positioning systems (GPS).

U.S. Pat. No. 20020067292 by Appenrodt, Nils; Berner, J.; Mezger; Wanielik filed Jul. 24, 2001 teaches multisensory correlation of traffic lanes from a digital road coupled with a navigation system and distance resolving sensor. U.S. Pat. No. 20030123930 by inventor Jacobs, Gregory; Khieu, Sithya; Tolliver teaches matrix element magnetic pavement marker having an array of magnetic pavement elements arranged in a predetermined pattern interconnected by a carrier web. Method described in German Patent application DE 19906614 al teaches a traffic lane detection sensor in the form of a video camera and an object position sensor composed of radar sensor which detects the markings lines at the road edge to the data of a digital map. Japanese Publication JP 10325869 teaches the same. German published Patent Application no. 19507957 proposes a tracking of travel speed regulating device with use of optical sensor by use of lane markings. German Published Patent no. 4200694 as well as Winner et. al. sae technical paper series 961010, 1996 p. 27-36 teaches adaptive cruise control. U.S. Pat. App No. 20040088079 by Lavarec, Erwan filed Nov. 14, 2003 disclosed methods and device for obstacle detection and distance measurements by infrared. U.S. Pat. Appl No. 20030046158 by Kratky, Joseph teaches about moving advertising target. U.S. Pat. Appl No. 20040049339 by Kober, Marcus; et al. teaches an assistance system for selecting a route with the aid of a computing device, a storage device, i/o device uses route parameters. U.S. Pat. No. 4,030,958 teaches behind a truck dispenser for applying adhesive back tapes to a surface. U.S. Dept. of Transportation dated July/August 1997 vol 61 no 1 stated a preliminary field evaluation of ultraviolet-activated fluorescent roadways disclosed when UV light strikes certain materials, the wavelength of the UV light become longer creating light that is visible by combining UV Headlight on vehicles and UV-activated fluorescent materials in roadway markings.

Prior technologies may not provide set and forget driving solutions, hands-free operations, or adaptive software for automated assistance in driving of vehicles. German patent application DE 19906614 teaches traffic lane detection in the form of a video camera and object position sensor which detects the marking lines of the road edges and presents the road edges on a digital map. Road edges provide an unreliable gauge for steering the vehicle. German patent application no. 19507957 proposes a regulating device with optical sensors for tracking travel speed using lane markings. The device disclosed in German patent application no. 19507957 provides a method to regulate speed and may not provide navigational information.

BRIEF SUMMARY OF THE INVENTION

An object of the invention is to provide hands-free operation of a motor vehicle that is assisted by a computer for navigation without the manual intervention of the driver.

Another object of the invention is to provide destination procedures that provide route planning options to the driver. The driver may obtain route information to a destination by inputting information about a desired destination.

Another object of the invention is to provide distance predictions between different locations for the commuters.

A further object of the invention is to provide computer-assisted means of driving that automatically adapts to different road conditions by automatic programming.

Yet another object of the invention is to provide applications for wired/wireless computers that operates by communicating with a main control module.

Still yet another object of the invention is to provide interactive road and pedestrian behaviors to the driver of the vehicle by determining changes in road conditions that exist on the travel route of the driver.

Another object of the invention is to alert the driver of hazards ahead by synchronizing with road workers and agencies.

Another object of the invention is to provide medical, fire, or police response that is triggered with any break in continuity of travel.

A further object of the invention is to provide software for different road conditions and updates that may be used by commuters by buying new software for new types of road.

Yet another object of the invention is to provide easy access to nearest hotels, parks, restaurants, etc. by wireless or wired computers.

Yet another object of the invention is to provide set and forget driving on side streets, with the same invention installed in vehicles for non-chaos crossing.

Another object of the invention is to provide accurate GPS locators that operate by precise mapping of the road.

Another object of the invention is to provide adjustments to shocks and suspensions of the vehicle, based on the data of the road conditions.

A further object of the invention is to provide efficient movement of goods and services that operates by locomotive type block of convoy.

Yet another object of the invention is to provide plan ahead commuting that operates by computing the number of commuters on the road.

Still yet another object of the invention is to provide efficient road management that operates by paid consultancy.

Another object of the invention is to provide input to government agencies for better constructions of highway by offering new technologies in road building.

Another object of the invention is to provide interactive advertisements of goods and services by providing interactive display, and by streaming audio-video content onto portable computers used for computer-assisted driving.

Yet another object of the invention is to provide protection for pavements by spraying protective overcoat.

Yet another object of the invention is to provide selectively visible ads, recognitions, acknowledgements printed on the pavements that are visible through ultraviolet or infrared visual devices.

Another object of the invention is to provide safety for commuters by marking pavements with orderly peaks and troughs such that vehicles do not slide off the road.

Another object of the invention is to provide photos, images, identifying marks printed on the highways and roads, that can be conveniently viewed by the driver from the driver's seating position.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, disclosed herein is a system and method for computer-assisted transportation, and for marking pavements with peaks and troughs. The system disclosed herein provides peaks and troughs on the pavement surface to induce vibrations in vehicles passing over the pavement surface. An array of sensors is provided on the vehicles to capture and measure these vibrations. The sensors may be vibration transducers positioned strategically on different parts of the vehicles. The sensors capture vibrations of the body of the vehicles when the vehicles move over peaks and troughs on the pavement surfaces. The sensors further measure the frequencies of the vibrations. Sensors independent of each other measure the frequencies of vibrations when the vehicle's tires come in contact with the marked pavement surfaces when driving. The pavement surfaces are identified with unique signatures associated with the marking on the pavement surfaces. The measured frequencies are matched with pre-specified frequencies by the on-board computer to determine the particular segment of the road traversed by the vehicle, for appropriate steering of the vehicle consistent with the software loaded in the on-board computer for that particular segment of the road. With any deviations in the road, a learning process by the system's proprietary software creates algorithms using robust built-in artificial intelligence capabilities automatically. The system also captures the sounds emitted or created when tires run over the pavements by reading the bounced sounds. The information from the vibration transducers and the sound sensors are processed concurrently, thereby achieving parallel high resolutions of frequencies. By reading the unique signatures, accurate spot locations of places, objects, and people are identified wirelessly by their location address. Vibrations and acoustics sensors may be placed on the axles, or suspensions of the vehicles. Since the sensors are tuned to specific frequencies, the sensors may also be placed inside the vehicles. The on-board computer controls, processes, and analyzes the data coming from the different sensors, and may be installed in the glove compartment, under the seat, trunk or any area for easy servicing. The on-board computer may be interfaced with a personal computer, or any wired/wireless devices.

In accordance with a preferred embodiment of the invention, there is disclosed a system and method for computer-assisted transportation and marking pavements with peaks and troughs. The troughs and peaks on the pavement surface are created using an apparatus made of flat sheet of metal or plastic adjustable to the width of the road being built for marking the cement or asphalt on the road after it has been built. The apparatus comprises two parts. The first part is a smooth finish to flatten the cement, asphalt and other road paving materials. The second part comprises mechanisms for marking the pavements. The apparatus has arrays of openings. These openings comprise a plurality of injection systems. These injection systems may be packaged as one unit or embodied in three different forms. In a first embodiment, the injection system comprises arrays of stamper rods or plungers, and each stamper rod or plunger is placed in a protective housing. The housing comprises return springs on the lower edges. In order to drive the stamper rods/plungers out of the openings for penetrating or stamping the paving materials at a predetermined depth, the injection system may use hydraulic systems, solenoids actuators or air pressure system. The depth of penetration into the paving material represents the unique signature of the road or the pavement. In a second embodiment, the injection system comprises nozzles at the end of the rods/plungers. The nozzles use air to make impressions on the cement, asphalt or other paving materials. Each nozzle comprises hose connections attached to air compressor regulator, which is computer controlled for exact impressions of data. The nozzle heads are interchangeable with printing heads. This may result in a low cost system since it does not need elaborate hydraulic, solenoid, actuator constructions. In a third embodiment, the injection system is a combination of the above two embodiments.

In accordance with a preferred embodiment of the invention, there is disclosed a system and method for printing selectively-visible paint or ink materials on the pavement. Further disclosed is a system of nozzles/heads for spraying paint to create markings on the pavements. Ultraviolet or infrared paint may be used for printing the markings on the pavements. Light waves of ultraviolet and infrared are part of the spectrum that are not visible to the naked eye. After the paint has been printed, ultraviolet or infrared emitter sensor illuminates the printed regions on the pavement surfaces and return signals are captured by ultraviolet or infrared receiver sensor. A laser source or a light emitting diode (LED) may be used.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 4 illustrates an enclosure attached to a truck for housing the apparatus for marking pavements.

FIG. 5 illustrates a piston type arrangement for stamper rods.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Disclosed herein is a system and method for computer-assisted transportation by marking pavements with peaks and troughs.

Figure 1:
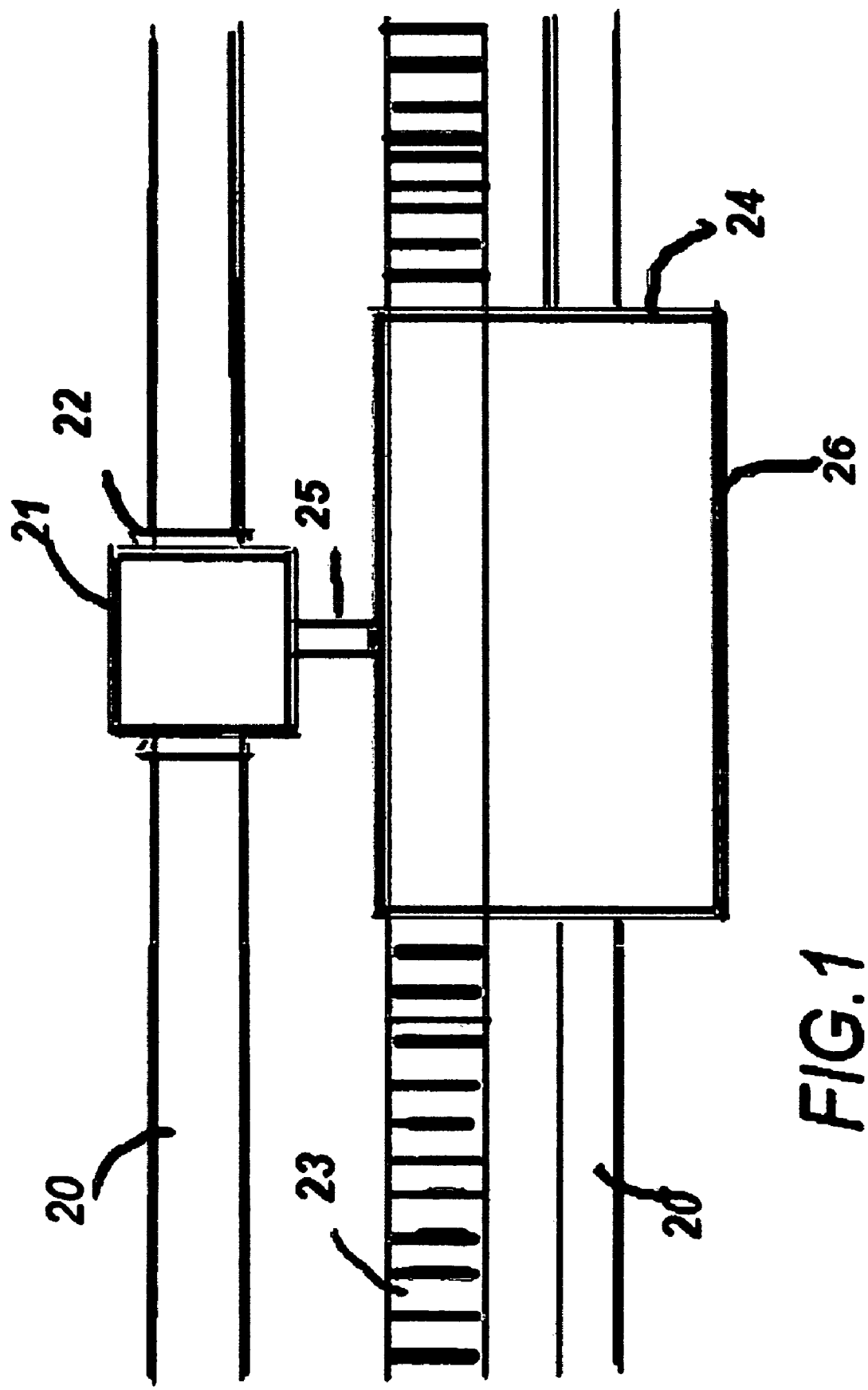
FIG. 1 exemplarily illustrates an apparatus for marking pavements with peaks and troughs.
Figure 2:
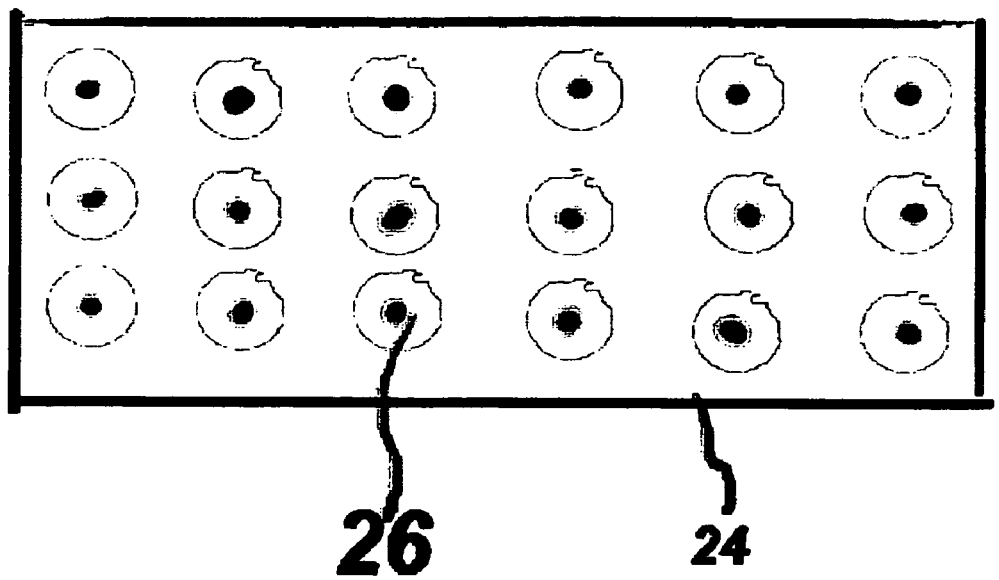
FIG. 2 exemplarily illustrates arrangement of nozzles in the apparatus for marking pavements.
Figure 3:
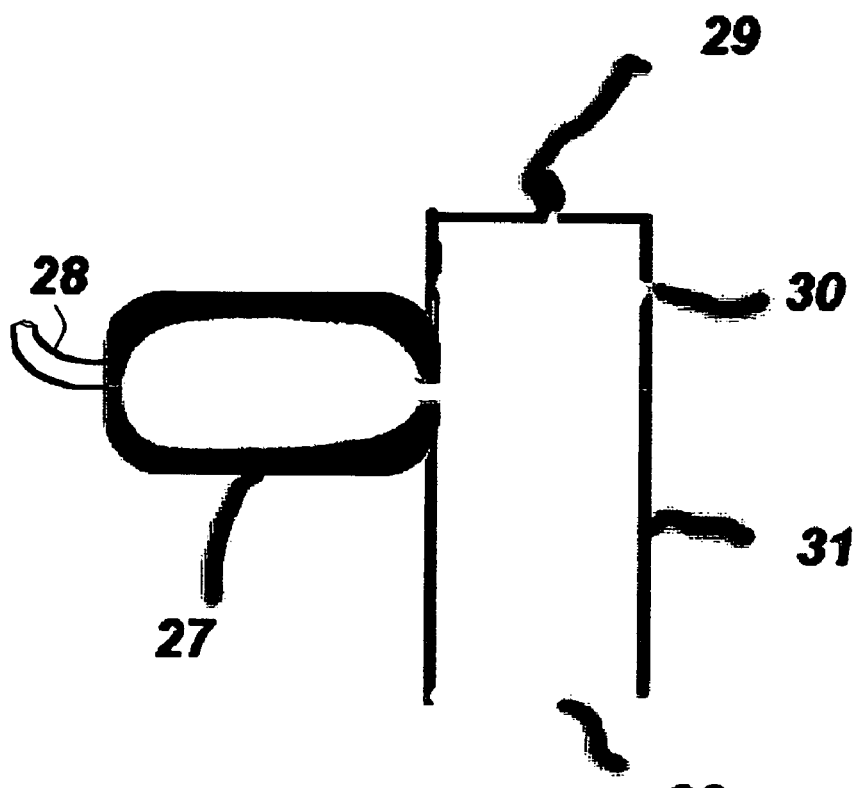
FIG. 3 exemplarily illustrates a nozzle for marking pavements using stamper rods or for printing selectively-visible paint.
Figure 6:
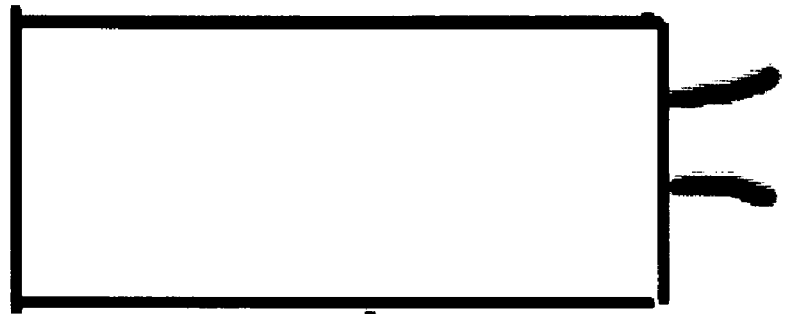
FIG. 6 exemplarily illustrates a sensor for reading vibrations on the body of vehicles.
Figure 7:
FIG. 7 illustrates a flat sheet of metal or plastic for surface finishing of the pavement surfaces.
Figure 8:
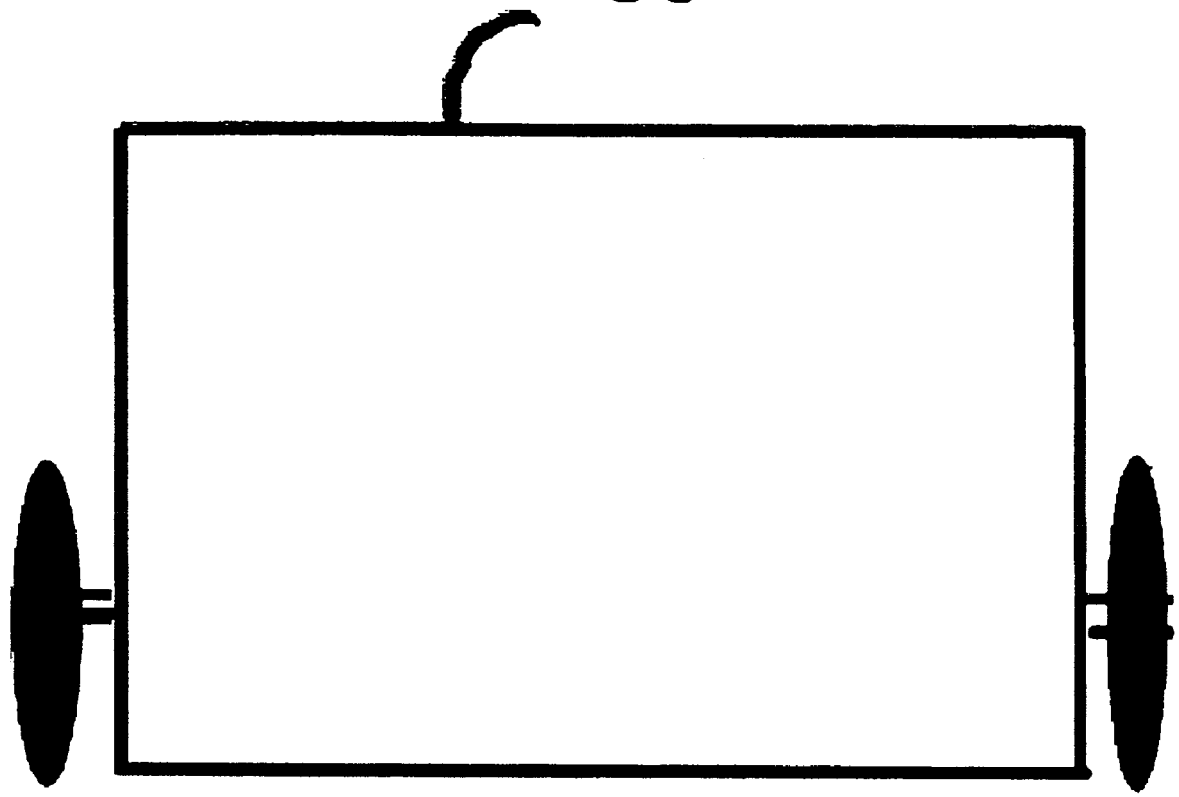
FIG. 8 exemplarily illustrates a trailer type vehicle or platform for housing the apparatus for marking pavements.

Turning first to FIG. 6, there is shown a sensor 36, preferably an array of vibration transducers that is strategically positioned on the body of the vehicles. For maximum vibration pick-up, the sensors may be connected to shocks and springs of the suspensions systems so that the movement of the tires can be effectively captured as they move over the pavement. The sensor wires are connected to computer control modules and/or attached to any portable computer or in this case to a laptop computer wirelessly, for processing captured sensor signals. Following the preferred procedure, deviations in the roads' peaks and troughs direct the computer programs to compute vehicle motion adjustments by the analysis of the unique signatures on the pavements. The on-board computer's proprietary software creates self conditioning algorithms by its built-in artificial intelligence to adapt to deviations in the captured sensor signals due to irregularities caused from debris and clutter on the pavement surfaces. In response to information acquired by the sensors that deviate from the normal, the on-board computer may self-heal/self-learn to adapt to changes temporarily. The on-board computer infers that the captured frequencies by the sensors does not match any frequency values stored in its databank and thereby proceeds with values of frequencies already known. In keeping with one of the principal objects of the invention, the sonic sensors are placed adjacent to each other to capture sounds made by the vibration of the wheels. Laser or LED pick-up may be used to read ultraviolet/infrared printed paint for high resolution over-sampled frequencies. In this way, accurate interactive steering and navigation of the vehicle is achieved. Commuters may have to update or buy new software in CDs, DVDs, Flash Cards, Hard Drive or any storage media suited depending on the road they intend to use. The arrangement of FIG. 1 is housed within the enclosure 35. To accomplish the step of marking the pavements, there is shown in FIG. 1, an electric motor 21, supported by holding brackets with rollers 22 thereby, to keep the electric motor 21 on track to a plurality of long adjustable guide metal bars 20. The parallel guide metal bars 20 are used to support the weight of the electric motor 21, housing 24, the nozzles 26, etc. The bracket 22 has bearings for easy gliding. The electric motor shaft 25 is connected to gears of the metal block housing 24. The metal block housing 24 comprises arrays of openings that comprise a plurality of injections systems 26. Flat smooth finish sheet of metal/plastic 37 in FIG. 7 is positioned as an independent segment to the housing 24. The housing 24 comprises interchangeable assembly from FIG. 5 enclosure 32 to printing heads 31 as described in FIGS. 1 and 2, and may be packaged as one. In carrying out the invention, the electric motor 21 with the housing 24 moves left or right within the enclosure 35 by having the gear in the housing connected by a rack and pinion arrangement 23. In the illustrated embodiment, marking is performed by the stamper rods or by printing selectively-visible paint image on the pavement via nozzles 26 as evident in FIG. 3. In accordance with the invention, FIG. 5 further illustrates an enclosure 32 that houses a piston 34A, return springs 34B and the stamper rods 34C. Hose 33 can be connected to hydraulic solenoids, actuators and air pressure systems to penetrate or stamp the asphalt/cement or materials on the pavement surface at a computerized predetermine depth. In a preferred construction, a printer with any selectively visible ink or paint, for example ultraviolet, infrared ink/paint as the preferred material is used. The ink/paint is stored in a secondary reservoir 27 and connected through another hose 28 to the main tank and aperture for the ink/paint to flow to printing head 31. In the present instance, pavements should be free of debris and clutter and ready for printing image/data and for laying long lasting UV/waterproof overcoat protection. The system for marking pavements may be mounted or built in a truck as illustrated in FIG. 4 and protected in an enclosure 35. For small works, the system for marking pavements may be mounted on a trailer type vehicle as illustrated in FIG. 8.

What is claimed is:

1. A method for computer-assisted driving of a vehicle, comprising the steps of:
   marking pavement surfaces with predefined patterns of peaks and troughs, whereby movement of said vehicle over said pavement surfaces produce vibrations in the vehicle;
   sensing and measuring frequencies of said vibrations when the vehicle traverses different segments of the pavement;
   determining the segment of the pavement traversed by the vehicle by matching said frequencies with pre-specified frequencies for said segment traversed;
   identifying navigational data and geographical data associated with said segment traversed; and
   directing an onboard computer to assist driving of the vehicle based on said navigational data and said geographical data.

2. The method of claim 1, wherein the onboard computer creates self conditioning algorithms to adapt to deviations in the frequencies of said vibrations due to irregularities in said predefined patterns caused from debris and clutter on the pavement surface.

3. The method of claim 1, wherein the vibrations are sensed and measured by an instrument selected from the group comprising an array of sensors, vibration transducers, acoustic sensors, and optical emitter/receivers.

4. The method of claim 3, wherein an array of sensors are positioned near suspension systems of the vehicle for maximum vibrations input.

5. The method of claim 1, wherein said step of sensing and measuring frequencies of vibrations comprises parallel processing of frequencies captured concurrently by the array of sensors to obtain higher resolution frequencies.

6. The method of claim 1, wherein the onboard computer is one of a stand-alone computing device, a connected device, a laptop, a personal digital assistant, and a wireless computing device.

7. The method of claim 1, wherein the navigational data and the geographic data comprise information on facilities, events, warning signs, and navigational information.

8. The method of claim 7, wherein the information on warning signs provide alerts to a driver of hazards ahead by synchronizing information obtained from road workers and appropriate agencies using the onboard computer.

9. The method of claim 7, wherein the information on facilities and events is rendered through interactive advertisements of goods and services using interactive displays, and by streaming audio-video content onto the onboard computer.

10. The method of claim 1, wherein said step of marking the pavement further comprises marking the pavement surfaces using predefined patterns of selectively non-visible paint or ink, wherein optical emitters/receivers positioned on the vehicle sense and capture unique signatures of the segment of pavement traversed by the vehicle from said predefined patterns of the selectively non-visible paint or ink.

11. The method of claim 10, wherein the selectively non-visible paint or ink comprises ultraviolet fluorescent materials, infrared fluorescent materials, and optical paint or ink.

12. The method of claim 10, wherein said optical emitters/receivers sense and capture unique signatures by illuminating the predefined patterns of selectively non-visible paint or ink on the pavement surfaces using a plurality of sources of illumination to capture the reflected beams, wherein said plurality of sources of illumination includes laser and light emitting diode sources.

13. The method of claim 1, wherein the onboard computer executes destination procedures for providing route planning options to a driver of the vehicle, wherein said driver obtains route information by entering information of a desired destination to the onboard computer.

14. The method of claim 1, wherein the navigational data comprises distance predictions between different locations.

15. The method of claim 1, wherein the step of assisting driving based on navigational data comprises providing interactive road and pedestrian behaviors to a driver of the vehicle by determining changes in road conditions that exist on a travel route of the driver.

16. The method of claim 1, wherein the geographical data is obtained using global positioning system locators, wherein said global positioning system locators include a precision map of a road.

17. The method of claim 1, wherein said step of assisting driving further comprises adjusting shocks and suspensions of the vehicle based on data of road conditions.

18. A method for computer-assisted driving of a vehicle comprising the steps of:
   marking pavement surfaces with predefined patterns of peaks and troughs, whereby tires of the vehicle emit sound characteristic of a segment of the pavement traversed by the vehicle;
   sensing and measuring frequencies of the sound emitted when the vehicle traverses said segment;
   determining the segment traversed by the vehicle by matching said measured frequencies with pre-specified frequencies for different segments of the pavement;
   identifying navigational data and geographical data associated with said segment traversed; and
   directing an onboard computer to assist driving of the vehicles based on said navigational data and said geographical data.

19. The method of claim 18, wherein the vehicle has an array of sensors selected from a group comprising acoustic sensors and optical emitter/receivers.

20. A method for computer-assisted driving of a vehicle, comprising the steps of:
   marking pavement surfaces with predefined patterns of peaks and troughs, whereby movement of said vehicle over said pavement surfaces produce vibrations in the vehicle, and whereby tires emit sound characteristic of a segment of the pavement traversed;
   sensing and measuring the frequencies of said vibrations and the frequencies of said sound when the vehicle traverses a segment of the pavement;
   determining the segment of the pavement traversed by the vehicle by matching said vibration frequencies and said sound frequencies with pre-specified vibration and sound frequencies respectively for the segment of the pavement traversed;
   parallel processing the information from the vibration frequencies and the sound frequencies to obtain higher resolution frequency identification of the segment of pavement traversed;
   identifying navigational data and geographical data associated with said frequency identification; and
   directing an onboard computer to assist driving of the vehicle based on said navigational data and said geographical data.

21. A system for computer-assisted driving of vehicles comprising:
   an array of sensors positioned on said vehicles for sensing vibrations produced due to movement of the vehicles over predefined patterns of peaks and troughs on pavement surfaces, wherein said sensors capture and measure frequency of the vibrations; and
   an onboard computer for providing navigational data and geographical data for said computer-assisted driving of the vehicles by matching said frequency with pre-specified frequencies, wherein said pre specified frequencies are associated with different segments of said pavement surfaces, said onboard computer comprising:
      a database for storing said pre-specified frequencies, the navigational data, and the geographical data.

* * * * *